(12) United States Patent
Maeda et al.

(10) Patent No.: US 6,283,305 B1
(45) Date of Patent: Sep. 4, 2001

(54) FILTER APPARATUS WITH BACKWASHING MECHANISM

(75) Inventors: Yoshihisa Maeda; Go Endo, both of Ibaraki; Takayuki Ishihara, Toyota, all of (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/517,572

(22) Filed: Mar. 2, 2000

(30) Foreign Application Priority Data

Jul. 30, 1999 (JP) .................................................. 11-216264

(51) Int. Cl.[7] .................................................. B01D 29/66
(52) U.S. Cl. ......................... 210/356; 210/108; 210/411; 210/488; 55/302
(58) Field of Search ........................ 210/90, 108, 333.01, 210/341, 354–357, 411, 486, 488; 55/302, 304

(56) References Cited

U.S. PATENT DOCUMENTS

| | | | | |
|---|---|---|---|---|
| 2,489,682 | * | 11/1949 | Smith et al. ..................... | 210/497.01 |
| 2,494,534 | * | 1/1950 | Armstrong et al. .................. | 210/108 |
| 2,494,535 | * | 1/1950 | Armstrong et al. ............ | 210/497.01 |
| 3,937,281 | * | 2/1976 | Harnsberger ......................... | 210/356 |
| 4,430,232 | * | 2/1984 | Doucet ................................ | 210/488 |
| 4,707,259 | * | 11/1987 | Doucet ................................ | 210/488 |
| 5,628,898 | * | 5/1997 | Eimer et al. ......................... | 210/108 |
| 6,209,728 | * | 4/2001 | Maeda et al. ........................ | 210/356 |

* cited by examiner

*Primary Examiner*—Joseph W. Drodge
(74) *Attorney, Agent, or Firm*—Oblon, Spivak, McClelland, Maier & Neustadt, P.C.

(57) ABSTRACT

For uniformly, satisfactorily, and automatically removing foreign matter that has accumulated on the filter, the apparatus includes a housing having an inflow portion and an outflow portion, a filter having a large number of piled resilient filter chips between which a filtering gap for passage of fluid to be filtered is formed, an actuator for expanding the filtering gap between spring members in backwashing, and a backwashing channel for causing backwash fluid to flow through the filter.

9 Claims, 9 Drawing Sheets

FILTER APPARATUS WITH BACKWASHING MECHANISM

FIELD OF THE INVENTION

The present invention relates to a filter apparatus with a backwashing mechanism in which clogging is removed by backwashing a filter by causing wash fluid to flow in a reverse direction to fluid to be filtered.

DESCRIPTION OF THE RELATED ART

Conventionally, there are known apparatuses having various structures as a filter apparatus that can carry out backwashing by using backwash fluid. In general, in a filter apparatus in which a porous filter face is formed of metal material and the like, when backwashing by using backwash fluid starts and foreign matter that has accumulated on a part of the filter is removed for the first time, flow-rate resistance at that part reduces significantly. Therefore, after that, the backwash fluid passes mainly through the part from which the foreign matter has been removed and pressure of the backwash fluid does not effectively act on the other part. As a result, it is impossible to remove the foreign matter uniformly from the entire filter face.

The above problem makes it difficult to automatically backwash the filter without maintenance of the filter. In other words, conventionally, it is necessary to remove the foreign matter that cannot be removed satisfactorily by backwashing by manual work and the like when a plurality of filters are disposed side by side and the filter is backwashed without stopping the entire apparatus by replacing the filters the filters with each other. Therefore, backwashing of the filter cannot be completely automated, and as a result, requires manpower.

On the other hand, there is a filter disclosed in Japanese Patent Application Laid-open No. 10-272315, in which a thread-shaped body constituting meshes of a filter main body includes groups of thread respectively positioned on an outer periphery side and an inner periphery side and phases of both the groups of thread are displaced from each other in a peripheral direction to change a size of meshes. In this filer, cuttings which have clogged the meshes can be removed by increasing the size of the meshes. However, because the size of the meshes is changed by displacing the phases of the groups of thread on the outer periphery side and the inner periphery side from each other, the size of the meshes can be changed only in a limited range and the filter does not necessarily meet user demands depending on objects to be filtered.

SUMMARY OF THE INVENTION

It is a technical object of the present invention to provide a filter apparatus with a backwashing mechanism for uniformly, satisfactorily, and automatically removing foreign matter that has accumulated on the filter.

It is another technical object of the invention to provide a filter apparatus with a backwashing mechanism for stabilizing filtering gaps in backwashing and for arbitrarily setting a degree of expansion of the filtering gaps according to object to be filtered by forming the filter of a large number of piled resilient filter chips.

It is yet another technical object of the invention to provide a filter apparatus assembly for automatic backwashing of the filter without necessity of maintenance and without manpower by replacing a plurality of filter apparatuses disposed side by side with each other in use of the assembly.

To achieve the above objects, according to the invention, there is provided a filter apparatus with a backwashing mechanism basically including: a housing having an inflow portion and an outflow portion for fluid to be filtered; a filter formed into a cylindrical shape from a plurality of piled resilient filter chips, having a filtering gap for passage of the fluid to be filtered between the respective filter chips, and positioned between the inflow portion and the outflow portion in the housing; a backwashing channel for causing wash fluid to flow through the filter in a direction reverse to the fluid to be filtered; and gap expanding means for expanding the filtering gap of the filter in backwashing by the wash fluid.

As a more concrete structure of the invention, in the first filter apparatus, the filter is formed of spring wire rod wound into a coil shape, a plurality of notches for forming the filtering gaps are formed on the spring wire rod, and the gap expanding means is formed of an actuator for driving the spring wire rod in such a direction as to move opposite ends of the spring wire rod away from each other.

As another concrete structure of the invention, in the second filter apparatus, the filter is formed by piling a plurality of annular leaf spring members, each the leaf spring member is formed with a spring portion for expanding a gap between the leaf spring member and adjacent leaf spring member by resilient force and a projecting portion for forming the filtering gap of fixed size between respective leaf spring members by functioning as a stopper when the filter is compressed, the gap expanding means is formed of an actuator, and the actuator compresses the piled leaf spring members against biasing force of the spring portions in filtering and cancels the compression in backwashing.

As a yet another concrete structure of the invention, in the third filter apparatus, the filter is formed by alternately piling a plurality of annular leaf spring members and filtering plates, each the leaf spring member is in a wave shape in a thickness direction, flattened to have a plate shape in compression, and restores the wave shape in non-compression to form a gap between the leaf spring member and the adjacent filtering plate, each the filtering plate has on front and back opposite faces thereof a large number of filtering grooves in radial directions, the gap expanding means is formed of an actuator, and the actuator pushes the leaf spring members against biasing force of the spring members in filtering and cancels the pushing in backwashing.

The first filter apparatus may include one or more intermediate retaining plates attached to an intermediate portion of the filter and gap adjusting means for stopping the intermediate retaining plates in such a position as to uniformalize the filtering gaps in expansion of the filter by operation of the actuator.

Each the filter apparatus preferably includes a differential pressure sensor for detecting clogging based on a difference between pressures on primary and secondary sides of the filter and a controller for controlling the gap expanding means based on output of the differential pressure sensor.

The filter apparatus with the backwashing mechanism of the invention with the above structure is usually used by arranging the plurality of apparatuses in parallel, using any of them all the time, and recycling one that is not used by backwashing for reuse. Otherwise, a single filter apparatus is used by recycling the apparatus by backwashing during an idle time of a machine cycle, because time required for backwashing is only few seconds or less.

In use of the filter apparatus, predetermined filtering gaps are formed in the cylindrical filter. In backwashing, on the other hand, the filtering gaps are expanded by means for expanding the filtering gaps of the filter or by biasing force of the large number of piled resilient filter chips. Therefore, when the backwash fluid is caused to flow through the backwashing channel, removal of the foreign matter that has accumulated on respective parts of the filter by the backwash fluid is facilitated and removal of the foreign matter by manual work or the like is unnecessary. In expanding the filtering gaps in backwashing, if positions of the intermediate retaining plates provided to the intermediate portions of the filter are adjusted by the gap adjusting means such that the entire filtering gaps are substantially uniformalized, the backwashing can be carried out further effectively.

By forming the filter of the plurality of piled resilient filter chips, the filtering gaps can be stabilized in backwashing and the degree of expansion of the filtering gaps can be set arbitrarily according to the object to be filtered.

In the filter formed of coil-shaped spring wire rod in the first filter apparatus, predetermined filtering gaps are formed by the notches provided to the spring wire rod in pressing of the spring members by the actuator. On the other hand, when the gap between opposite ends of each the spring member is expanded by the actuator, the filtering gaps in the spring wire rod are expanded substantially uniformly by resilience possessed by the spring wire rod or by cooperation between the resilience and adjustment of the positions of the intermediate portions of the filter by the intermediate retaining plates.

In the filter formed by piling the annular leaf spring members in the second filter apparatus, the filtering gaps of fixed size are formed when the projecting portion provided to each the leaf spring member functions as the stopper in pressing of the leaf spring members toward each other by the actuator. On the other hand, when pressing of the leaf spring members toward each other by the actuator is cancelled, the filtering gaps between the leaf spring members and the adjacent leaf spring members are expanded substantially uniformly by the spring portion provided to each the leaf spring member.

Furthermore, in the filter formed by alternately piling the large number of annular leaf spring members and filtering plates in the third filter apparatus, each the leaf spring member is flattened to have a plate shape in compression of the spring member and fixed filtering gaps are formed between the leaf spring members and filtering grooves on the front and back opposite faces of the filtering plates. On the other hand, when pushing by the actuator is cancelled, each the leaf spring member is curved to have the wave shape in its thickness direction and the filtering gaps between the leaf spring members and the adjacent filtering plates are expanded.

In the first to third filter apparatuses, the filter may be compressed by the actuator after backwashing such that predetermined filtering gaps are formed.

DESCRIPTION OF THE PREFERRED EMBODIMENTS

Embodiments of a filter apparatus with a backwashing mechanism of the invention will be specifically described based on the drawings.

Figure 1:
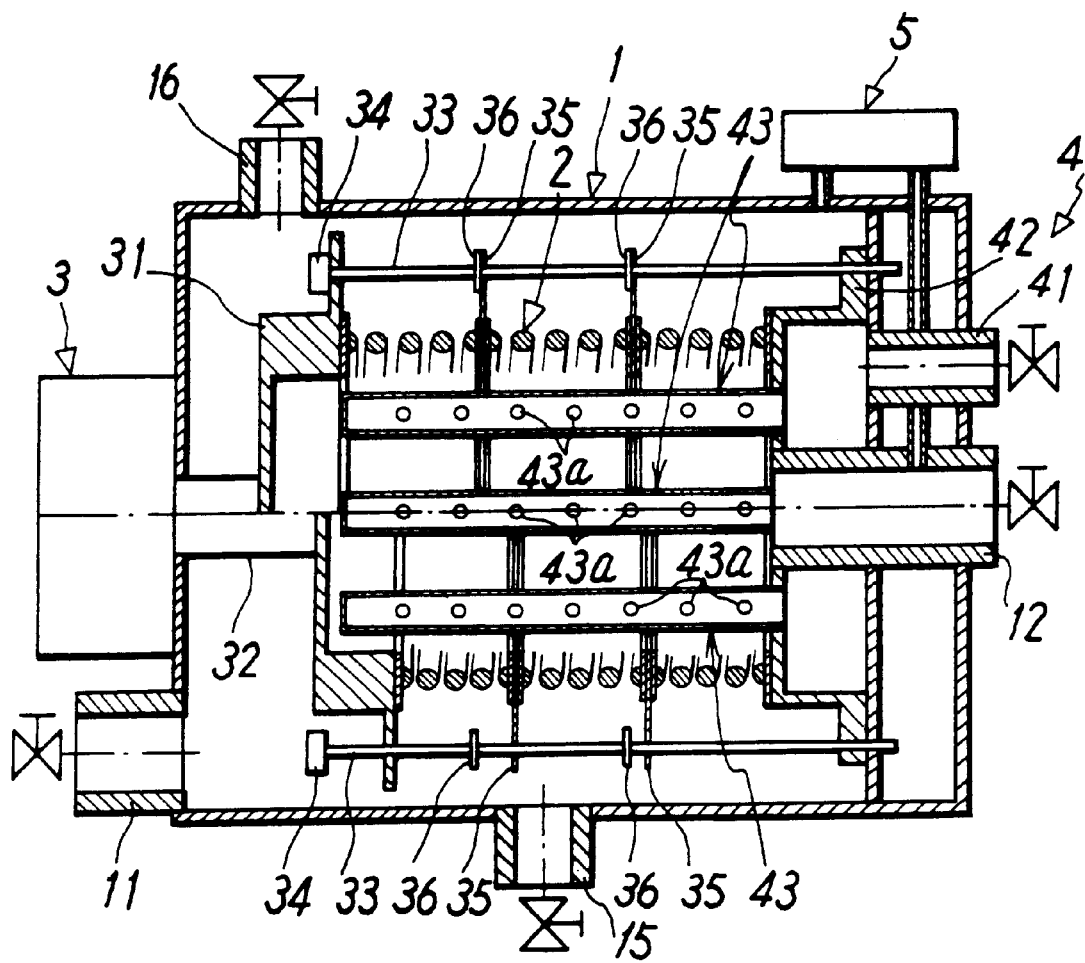
FIG. 1 is a side sectional view showing states of filtering (a lower half portion) and backwashing (an upper half portion) in a filter apparatus with a backwashing mechanism of a first embodiment of the present invention.
Figure 2:
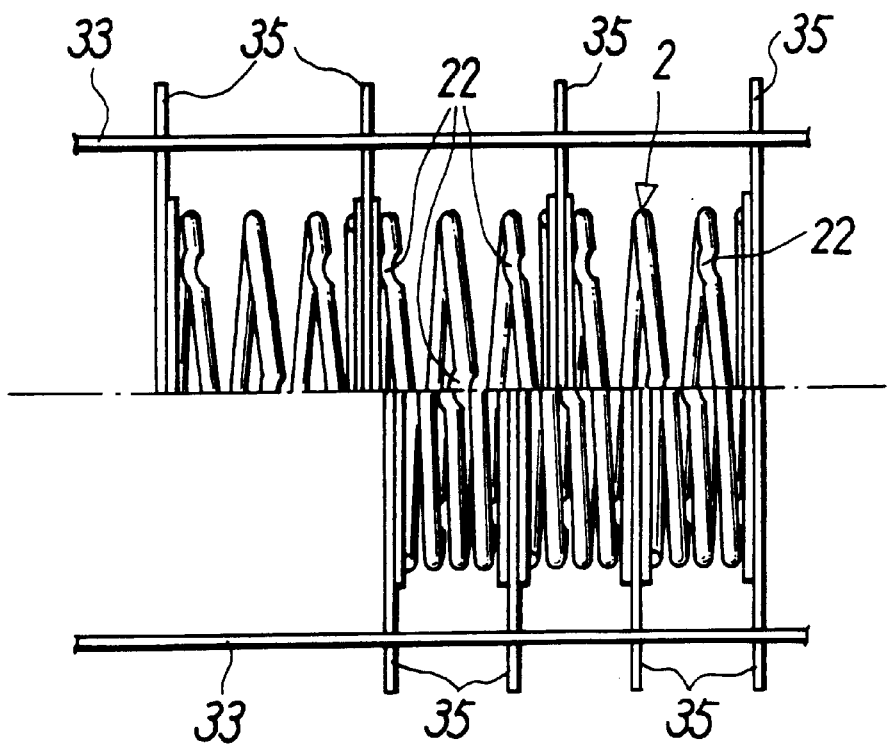
FIG. 2 is a side view showing states of filtering (a lower half portion) and backwashing (an upper half portion) in the filter.

FIGS. 1 and 2 show a first embodiment of the invention. As shown in FIG. 1, the filter apparatus with the backwashing mechanism of the first embodiment generally includes a housing 1 having an inflow portion 11 and an outflow portion 12, a filter 2 formed of a plurality of piled resilient filter chips into an expanding and contracting cylindrical shape and disposed between the inflow portion 11 and the outflow porti on 12 in the housing 1, an actuator 3 for compressing the filter 2 in filtering to form a filtering gap of a predetermined size between respective filter chips and for canceling the compression of the filter 2 in backwashing to expand the filtering gaps, a backwashing channel 4 through which fluid for backwashing the filter 2 flows, and a differential pressure sensor 5 for detecting a difference differential pressure between pressures on a primary side and a secondary side of the filter 2.

More specifically, the housing 1 is formed with the inflow portion 11 for fluid to be filtered at an end in an axial direction of the housing 1, the outflow portion 12 for the filtered fluid at the other end of the housing 1, and a backwash fluid supply pipe 41 constituting the backwashing channel 4 through which the backwash fluid flows in the vicinity of the outflow portion 12, as shown in FIG. 1. An inner end of the backwash fluid supply pipe 41 communicates with a backwash fluid supply portion 42 in a shape of a disk-shaped container that constitutes the backwashing channel 4 together with the supply pipe 41. The outflow portion 12 passes through the backwash fluid supply portion 42 and opens into the housing 1.

As shown in detail in FIG. 2, the above filter 2 is formed into a cylindrical shape by using spring wire rod wound into a coil shape. An end of the filter 2 is fixed to a periphery of the outflow portion 12 that passes through the backwash fluid supply portion 42 and opens and the other end of the filter 2 is fixed to an end plate 31 supported for movement in an axial direction of the filter 2 when driven by the actuator 3. A predetermined number of notches 22 are provided at substantially uniform intervals per unit winding of the spring wire rod constituting the filter 2, thereby setting filtering gaps in compression of the filter 2.

In proper positions in the axial direction of the filter 2, a plurality of intermediate retaining plates 35 which move when guided by the guide bars 33 are disposed at necessary intervals and intermediate positions of the spring wire rod constituting the filter 2 are fixed to the intermediate retaining plates 35. The spring wire rod may be fixed to the intermediate retaining plate 35 by causing the intermediate portion of each winding of the spring wire rod to pass through each the intermediate retaining plate 35 to project to an opposite side or by cutting each winding of the spring wire rod at a position corresponding to each the intermediate retaining plate 35 and fixing each cut end to each the intermediate retaining plate 35.

Furthermore, as shown in FIG. 1, a plurality of backwash fluid spouting pipes 43 standing at a periphery of the outflow portion 12 in the backwash fluid supply portion 42 are inserted into the filter 2 and a large number of holes 43a for spouting the backwash fluid are formed on a peripheral face of each the pipe 43.

The actuator 3 is for forming the filtering gap with the predetermined size between respective filter chips by compressing the spring wire rod constituting the filter 2 in filtering and for expanding the filtering gap in backwashing of the filter 2 and is formed of a known cylinder device.

The actuator 3 is controlled by a controller (not shown) when the differential pressure sensor 5 has sensed a difference between pressures on the primary side and the secondary side of the filter 2 to detect clogging of the filter 2 and moves the end plate 31 in such a direction as to expand the filtering gaps of the filter 2. A piston rod 32 that reciprocates when driven by the actuator 3 is air-tightly inserted from a side face on an inflow portion 11 side of the housing 1 and the end plate 31 is mounted to a tip end of the rod 32. The plurality of guide bars 33 provided along the expanding and contracting direction of the filter 2 is movably inserted through the periphery of the filter 2 in the housing 1. To tip ends of the guide bars 33, a stopper 34 for setting a limit to the gap between the spring wire rod in backwashing by limiting movement of the end plate 31 are mounted. The intermediate retaining plates 35 provided in proper positions in the axial direction of the filter 2 are guided by the guide bars 33 to suppress unevenness of the filtering gaps of the spring wire rod and to substantially maintain uniformity of the gaps. To the guide bars 33, stoppers 36 as gap adjusting means for limiting movement of the respective intermediate retaining plates 35 attached to the filter 2 are mounted at necessary intervals.

A reference numeral 15 in FIG. 1 designates a drain outlet for the backwash fluid provided to a bottom face of the housing 1 and a reference numeral 16 designates a ventilating opening provided to an upper face of the housing.

In the filter apparatus with the backwashing mechanism with the above structure, predetermined filtering gaps defined by notches 22 provided to the spring wire rod are formed in the filter 2 by compression of the filter 2 by the actuator 3 in filtering. In backwashing, on the other hand, because each filtering gap is expanded by the actuator 3 or resilient force of the spring wire rod constituting the filter 2, removal of the foreign matter that has accumulated on respective parts of the filter 2 by the backwash fluid is facilitated and removal of the foreign matter by manual work is unnecessary. In expanding the filtering gaps in backwashing, the filter 2 can be backwashed further effectively by adjusting positions of the intermediate retaining plates 35 provided at intermediate portions of the filter 2 by the stoppers 36 that are the gap adjusting means to substantially uniformalize all the filtering gaps of the filter 2.

In the filter 2 formed of the coil-shaped spring wire rod in the first embodiment, predetermined filtering gaps are formed by the notches 22 provided to the spring wire rod when the actuator 3 presses the spring wire rod. On the other hand, when the actuator 3 expands a gap between opposite ends of the spring wire rod, the filtering gaps of the spring wire rod are expanded substantially uniformly by resilient force of the spring wire rod or by cooperation between the resilient force and adjustment of the positions of the intermediate portions of the filter 2 by the intermediate retaining plates 35. As a result, it is possible to uniformly, satisfactorily, and automatically remove the foreign matter that has accumulated on the filter 2 in the backwashing.

Moreover, by using the large number of piled resilient filter chips as the filter 2, it is possible to stabilize the filtering gaps in the backwashing and to arbitrarily set a degree of expanding of the filtering gaps according to objects to be filtered.

Figure 3:
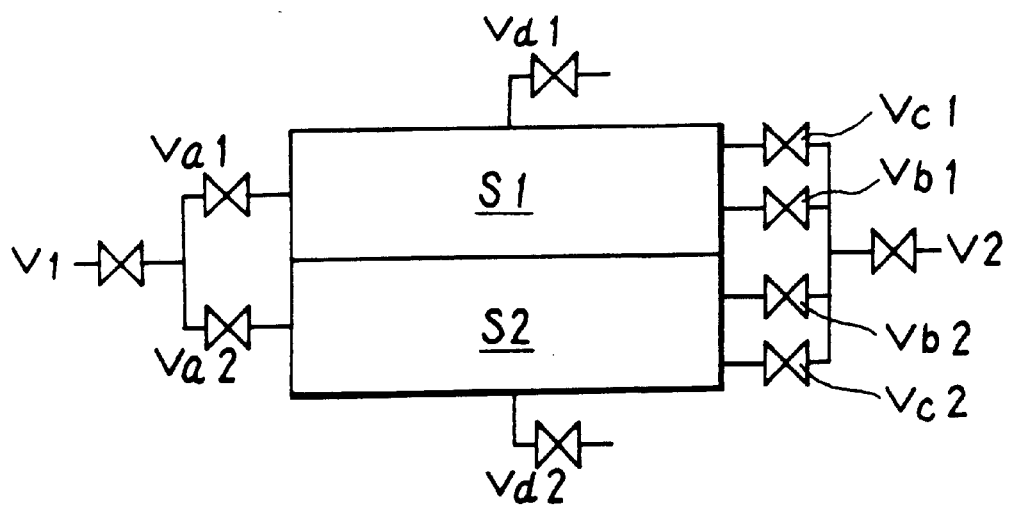
FIG. 3 is an explanatory view showing a form in which a plurality of filter apparatuses with backwashing mechanisms of the invention are replaced with each other in use of the apparatuses.

As described above, according to the filter apparatus with the backwashing mechanism, the foreign matter that has accumulated on the filter can be removed uniformly, easily, and automatically. Therefore, if the filter apparatuses S1 and S2 are provided such that a plurality of filters are replaced with each other as schematically shown in FIG. 3, automatic backwashing of the filter without necessity of maintenance is possible without manpower.

In other words, in a case in which fluid to be filtered that has flowed in through a valve V1 is filtered in the filter apparatus S1 and the filter is backwashed in the filter apparatus S2, a valve Va1 that communicates with an inflow portion of the filter apparatus S1 is opened and a valve Va2 that communicates with the inflow portion of the filter apparatus S2 is closed. In this state, in the filter apparatus S1, a valve Vb1 that communicates with the inflow portion is opened and a valve Vc1 that communicates with a backwashing channel is closed. In the filter apparatus S2, on the other hand, a valve Vb2 that communicates with an outflow portion is closed and a valve Vc2 that communicates with the backwashing channel is opened. At this time, the fluid filtered by the filter apparatus S1 flows out through the valve V2, but a part of the fluid flows through the valve Vc2 into the filter apparatus S2 as the backwash fluid and is discharged through the valve Vd2 that communicates with the drain outlet after backwashing the filter in the filter apparatus 2. After the backwashing, the valves Vc2 and Vd2 are closed.

On the contrary, in a case in which fluid to be filtered that has flowed in through the valve V1 is filtered in the filter apparatus S2 and the filter is backwashed in the filter apparatus S1, the valve Va2 that communicates with the inflow portion of the filter apparatus S2 is opened and the valve Va1 that communicates with the inflow portion of the filter apparatus S1 is closed. In this state, in the filter apparatus S1, the valve Vb1 that communicates with the inflow portion is closed and the valve Vc1 that communicates with the backwashing channel is opened. On the other hand, in the filter apparatus S2, the valve Vb2 that communicates with the outflow portion is opened and the valve Vc2 that communicates with the backwashing channel is closed. At this time, the fluid filtered by the filter apparatus S2 flows out through the valve V2, but a part of the fluid flows through the valve Vc1 into the filter apparatus S1 as the backwash fluid and is discharged through the valve Vd1 that communicates with the drain outlet after backwashing the filter in the filter apparatus 1. After the backwashing, the valves Vc1 and Vd1 are closed.

As described above, according to the filter apparatus with the backwashing mechanism, a plurality of filter apparatuses S1 and S2 may be disposed side by side and any of them may be used while another that is not used may be successively backwashed and recycled for reuse.

Figure 4:
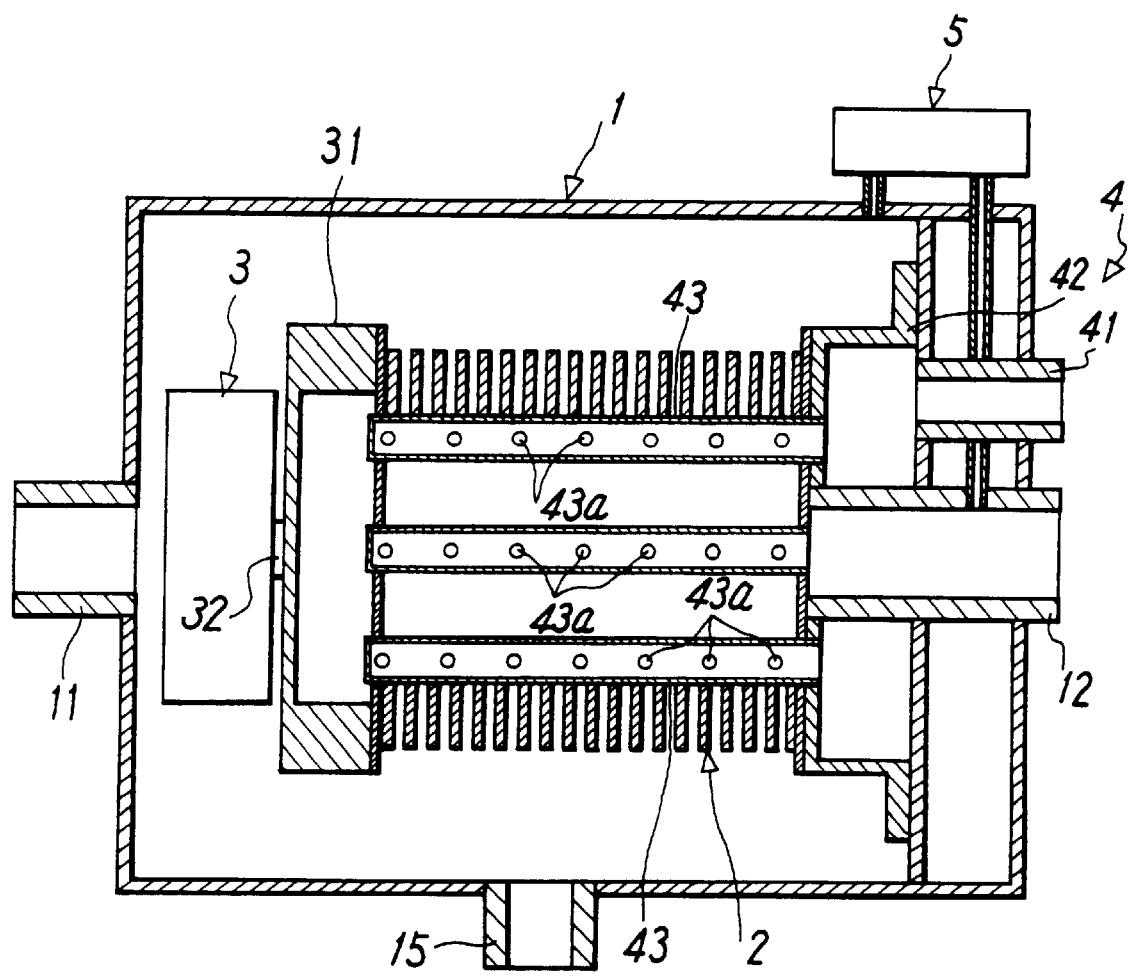
FIG. 4 is a side sectional view showing a state of backwashing in a filter apparatus with a backwashing mechanism of a second embodiment of the invention.
Figure 5:
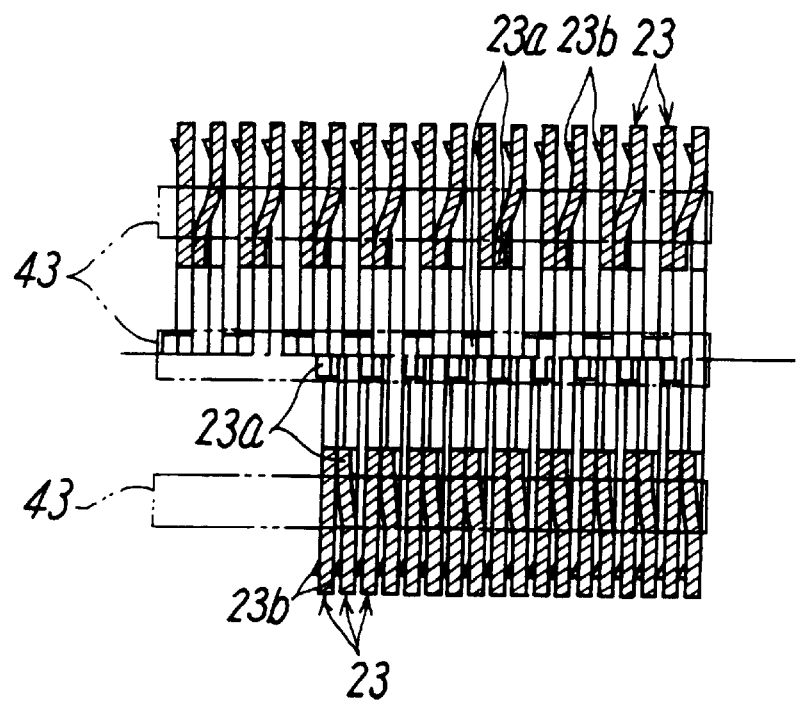
FIG. 5 is a side sectional view showing states of filtering (a lower half portion) and backwashing (an upper half portion) in the filter.
Figure 6:
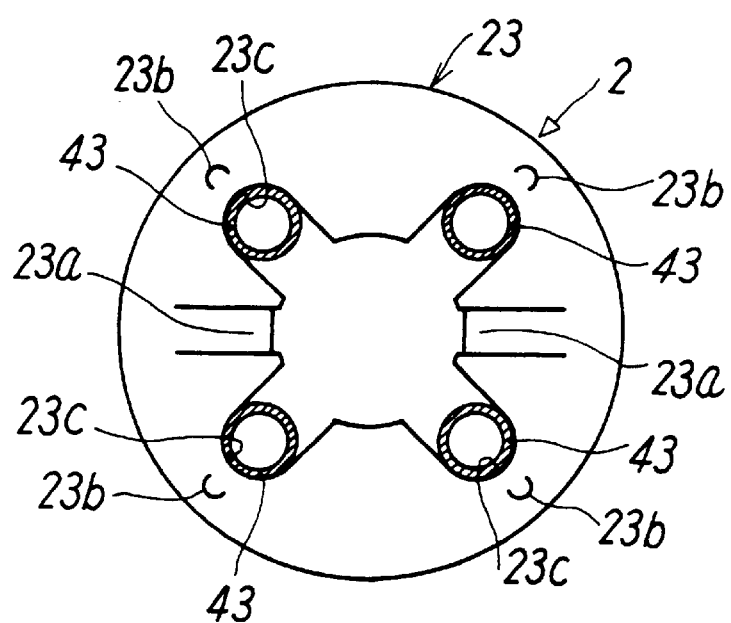
FIG. 6 is a front view of the filter.

Next, FIGS. 4 to 6 show the second embodiment of the invention.

In a filter apparatus with a backwashing mechanism of the second embodiment, a filter 2 is formed into a cylindrical shape by piling a plurality of annular leaf spring members 23 and a spring portion 23a for expanding a gap between the leaf spring member and the adjacent leaf spring member by resilient force and a projecting portion 23b for forming a filtering gap of fixed size between the respective leaf spring members 23, 23 by functioning as a stopper when the filter 2 is compressed are provided to each the leaf spring member 23 by cutting and raising up a portion of the leaf spring member 23 as clearly shown in FIGS. 5 and 6. The respective leaf spring members 23 are piled such that orientation of the spring portion 23a is alternately displaced through 90 from that of the spring portion 23a of the adjacent leaf spring member 23.

As shown in FIG. 4, an inside of the filter 2 communicates with the outflow portion 12 of the housing 1 and a backwash fluid spouting pipe 43 inserted into a recessed portion 23c in a radial direction on an inner side of a ring of each the leaf spring member 23 is used as a support guide for the large number of leaf spring members 23 constituting the filter 2 in the cylindrical filter 2.

In the filter apparatus with the backwashing mechanism of the second embodiment having the above structure, the fixed filtering gaps are formed when the projecting portion 23b provided to each the leaf spring member 23 functions as the stopper when the filter 2 formed of the annular leaf spring members 23 is compressed by movement of the end plate 31 by the actuator 3. On the other hand, when compression of the leaf spring members 23 is cancelled by the actuator 3, the filtering gap between respective adjacent leaf spring members 23 is expanded substantially uniformly by the spring portion 23a provided to each the leaf spring member 23.

Although a case in which the large number of leaf spring members 23 constituting the filter 2 are guided by the backwash fluid spouting pipe 43 used as the support guide is described in the second embodiment, the invention is not limited to this case.

Because other structures and operations of the filter apparatus with the backwashing mechanism of the second embodiment are substantially similar to those of the first embodiment, descriptions of them are omitted by providing similar reference numerals and characters to similar or corresponding portions.

FIGS. 7 to 12 show a third embodiment of the invention.

Figure 7:
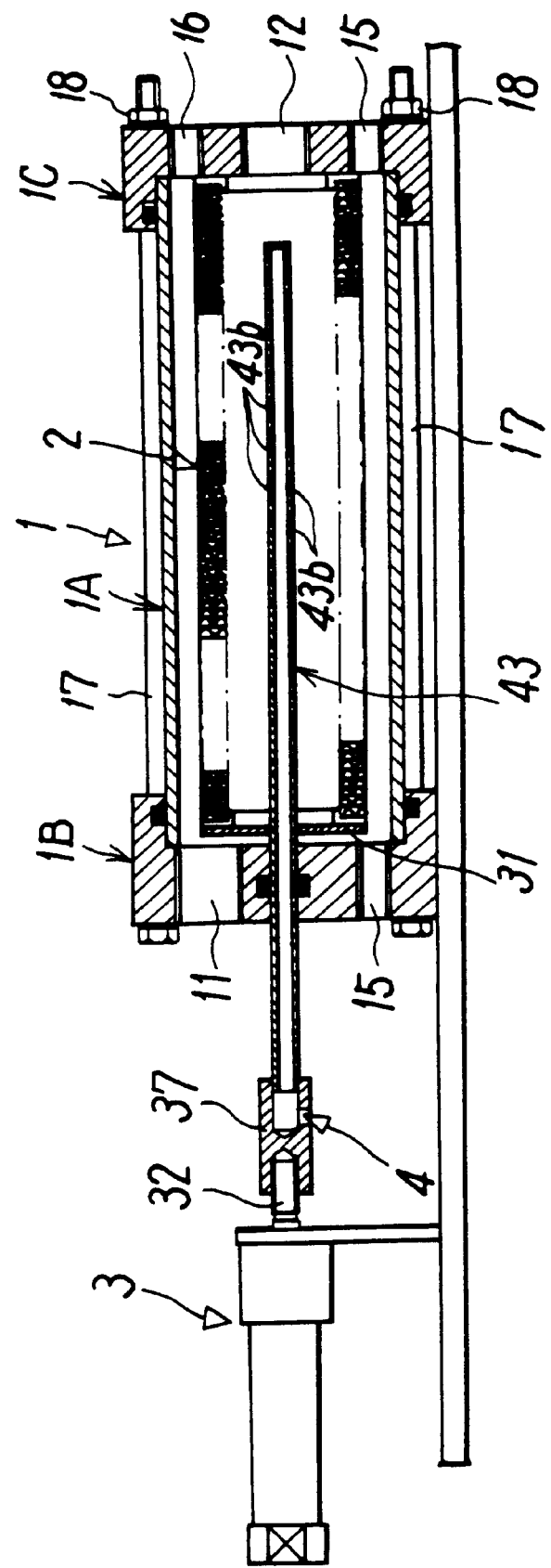
FIG. 7 is a side sectional view showing a state of backwashing in a filter apparatus with a backwashing mechanism of a third embodiment of the invention.

As shown in FIG. 7, the filter apparatus with the backwashing mechanism of the third embodiment has a housing 1 formed by respectively fitting end blocks 1B and 1C to opposite ends of a cylinder 1A, a filter 2 (see FIGS. 7 and 9) that is between the end blocks 1B and 1C in the housing 1 and formed into a substantially cylindrical shape by alternately piling a large number of annular leaf spring members 24 and filtering plates 25, an actuator (cylinder) 3 for pushing the leaf spring members 24 and the filtering plates 25 against each other against biasing force of the leaf spring members 24 by driving an end plate 31 closing the end portion of the filter 2 in filtering and for canceling the pushing in backwashing, and a porous backwash fluid spouting pipe 4 including a backwashing channel 4 through which fluid for backwashing the filter 2 flows. A differential pressure sensor for detecting clogging of the filter 2 by sensing a difference between pressures on a primary side and a secondary side of the filter 2 and a controller for controlling driving of the actuator 3 based on output of the differential pressure sensor 5 are attached to the apparatus, though they are not shown in the drawings.

Figure 8:
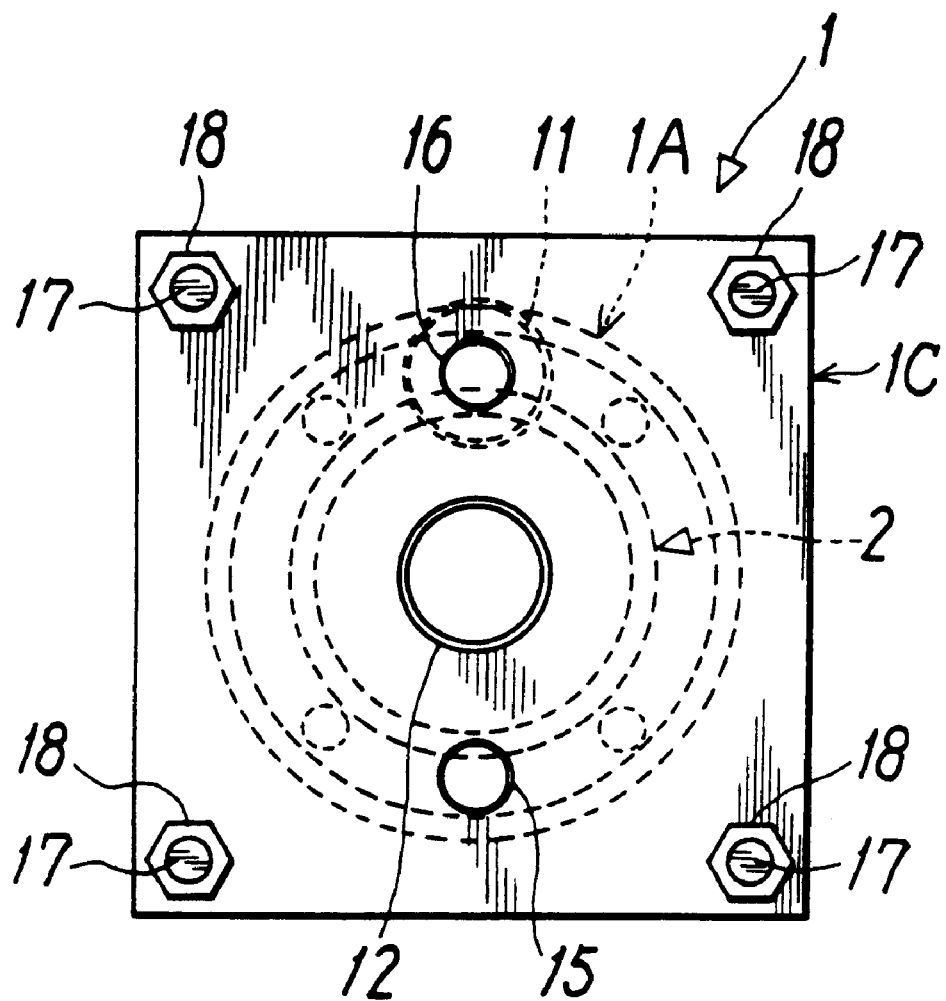
FIG. 8 is a back view of the apparatus in FIG. 7.

As shown in FIGS. 7 and 8, the housing 1 is formed by fitting the end block 1B having an inflow portion 11 for fluid to be filtered to an end of the substantially cylindrical cylinder 1A, fitting the end block 1C having an outflow portion 12 for the filtered fluid to the other end of the cylinder 1A, and fastening four corners of each of the end blocks 1B and 1C by bolts 17 and 18. The backwash fluid spouting pipe 43 connected to a piston rod 32 of the actuator 3 through a connecting member 37 is air-tightly inserted into a center of the end block 1B through a seal that is an O ring 13 such that the backwash fluid spouting pipe 43 can slide in an axial direction of the housing 1. The connecting member 37 has the backwashing channel 4 that communicates with the backwash fluid spouting pipe 43 and the backwash fluid is supplied through the backwashing channel 4 in the backwashing of the filter 2.

To the backwash fluid spouting pipe 43, an end plate 31 for fixing an end of the filter 2 is fitted and a large number of backwashing nozzles 43b for spouting the backwash fluid are provided at substantially equal intervals in an area extending from a tip end of the pipe 43 to the vicinity of the end plate 31.

Figure 9:
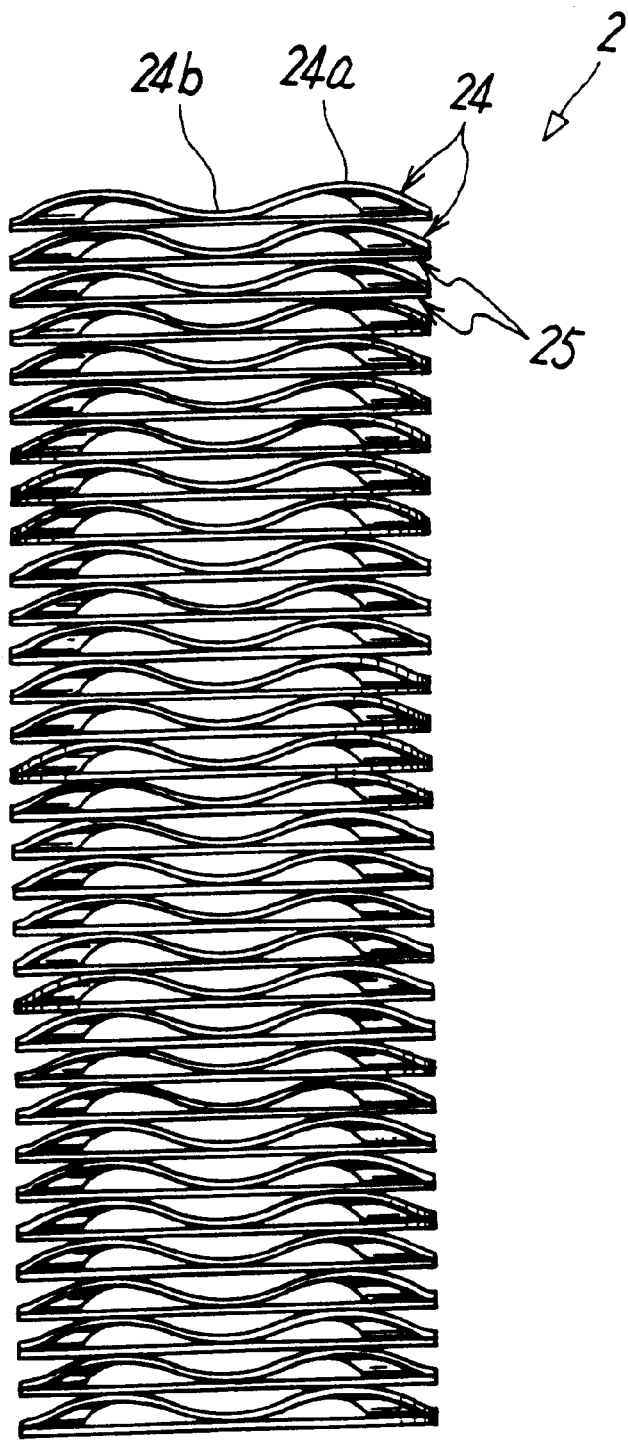
FIG. 9 is a side view of the filter.
Figure 10A:
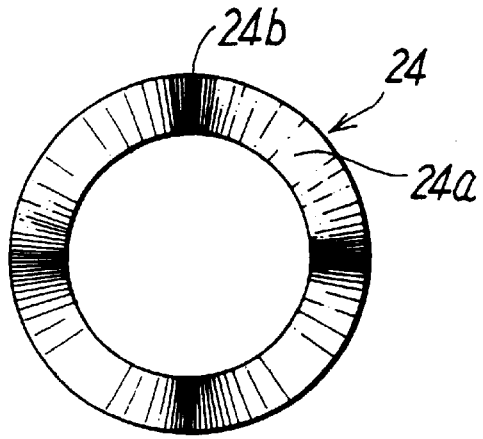
FIG. 10(a) is a front view of a leaf spring member of the filter and FIG. 10(b) is a side view of the filter.
Figure 10B:
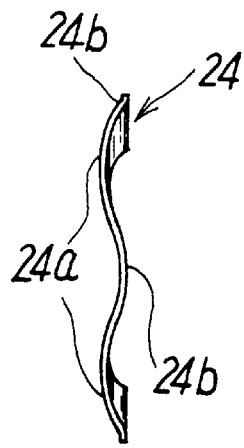
Figure 11:
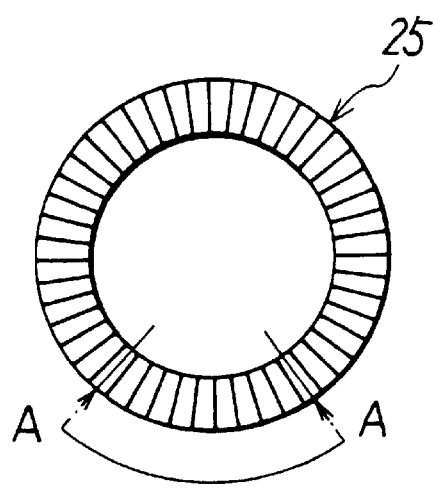
FIG. 11 is a front view of a filtering plate of the filter.
Figure 12:
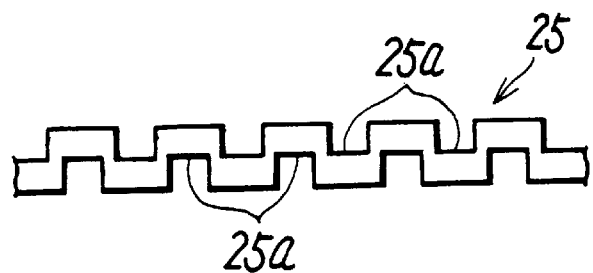
FIG. 12 is an end view taken along a line A—A in FIG. 11.

As shown in FIG. 9, the filter 2 is formed into the cylindrical shape as a whole by alternately piling the plurality of leaf spring members 24 and filtering plates 25 and the filtering plate 25 has a large number of filtering grooves 25a in radial directions on front and back opposite faces of the filtering plate 25 as shown in FIGS. 11 and 12. On the other hand, the leaf spring member 24 is flattened to have a plate shape in compression and is curved in its thickness direction to have a wave shape so as to bias the adjacent filtering plate in such a direction as to form a gap between the adjacent filtering plate and the leaf spring member in non-compression, as shown in FIGS. 9, 10(a), and 10(b). FIGS. 10(a) and 10(b) show a portion 24a that curves to project upward and a portion 24b that curves to project downward.

As shown in FIG. 7, the one end of the filter 2 is fixed to an inner face of the end block 1C of the housing 1 while enclosing the outflow portion 12 and the other end of the filter 2 is fixed to the end plate 31 fitted to the backwash fluid spouting pipe 43. Between the end blocks 1B and 1C, a plurality of guide bars 26 are disposed on a periphery of the filter 2 along the axial direction of the filter 2 as shown in FIG. 8. The guide bars 26 are in contact with outsides of the leaf spring members 24 and the filtering plates 25 to maintain the piled state of the leaf spring members 24 and the filtering plates 25.

In the filter apparatus with the backwashing mechanism of the third embodiment having the above structure, the end plate 31 fitted to the backwash fluid spouting pipe 43 presses the filter 2 to set the filtering gaps of the filter 2 by sliding the pipe 43 in such as direction as to push the pipe 43 into the housing 1 by the actuator in filtering. In other words, in the filter 2 formed by alternately piling the large number of leaf spring members 24 and the filtering plates 25, the leaf spring members 24 are flattened to have plate shapes in compression of the leaf spring members 24, thereby setting the fixed filtering gap between each of the filtering grooves 25a on the front and back opposite faces of the filtering plate 25 and the leaf spring member 24.

In the backwashing, on the other hand, pressing by the end plate 31 is cancelled by sliding the pipe 43 in such a direction as to pull out the pipe 43 by the actuator 3, each the leaf spring member 24 curves to have the wave shape in its thickness direction, and the filtering gap between the adjacent filtering plate 25 and the leaf spring member 24 is expanded.

Because other structures and operations of the third embodiment are substantially similar to those of the first embodiment, descriptions of them are omitted by providing similar reference numerals and characters to similar or corresponding portions.

Figure 13:
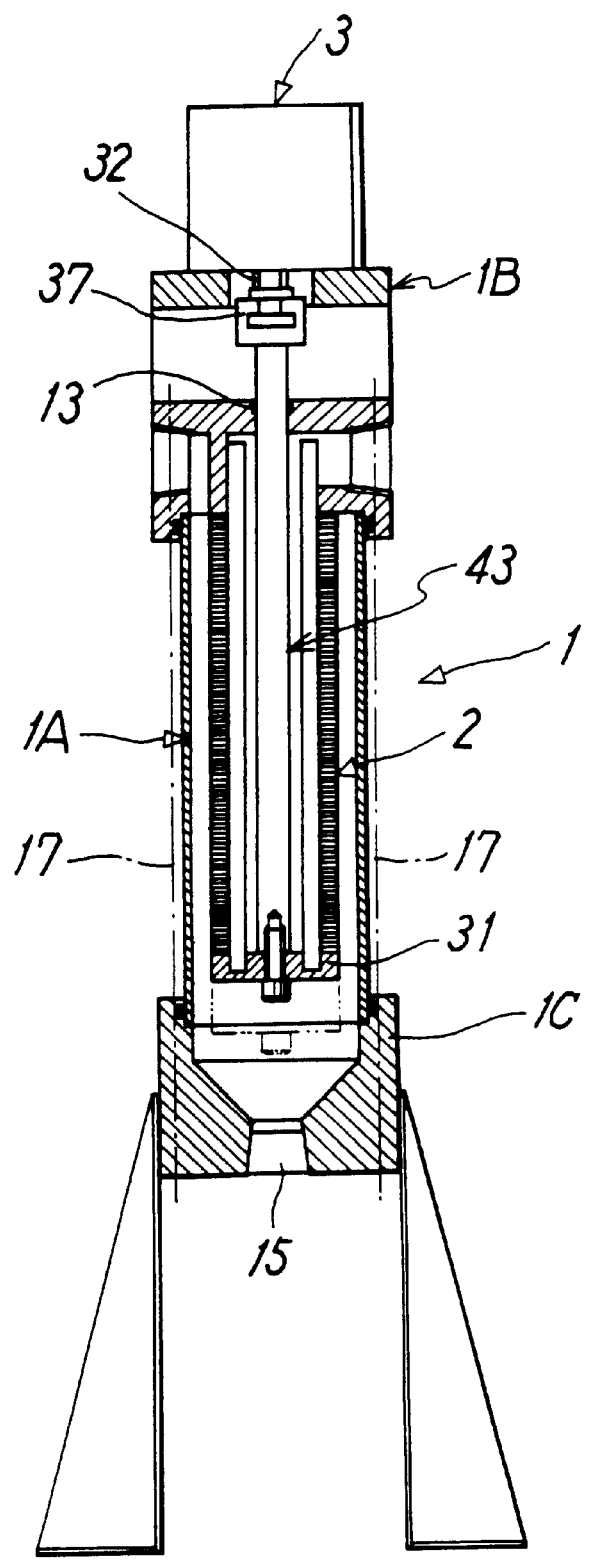
FIG. 13 is a side sectional view showing a state of backwashing in a filter apparatus with a backwashing mechanism of a fourth embodiment of the invention.

FIG. 13 shows a fourth embodiment of the invention.

A filter apparatus with a backwashing mechanism of the fourth embodiment has a housing 1 formed by respectively fitting end blocks 1B and 1C to upper and lower opposite ends of a cylinder 1A in a substantially cylindrical shape and disposed on a mount, a filter 2 (see FIGS. 7 and 9) that is between the end blocks 1B and 1C in the housing 1 and has a similar structure as the filter in the third embodiment, an actuator (cylinder) 3 for pushing the spring members 24 and the filtering plates 25 against each other against biasing force of the leaf spring members 24 by driving an end plate 31 closing the end portion of the filter 2 in filtering and for canceling the pushing in backwashing, and a porous backwash fluid spouting pipe 43 including a backwashing channel 4 through which fluid for backwashing the filter 2 flows.

The housing 1 is formed by fitting the upper end block 1B formed at a side face thereof with an inflow portion 11 and an outflow portion 12 for the fluid to be filtered to the upper end of the substantially cylindrical cylinder 1A, fitting the lower end block 1C having at a bottom face thereof a drain outlet 15 for the backwash fluid to the lower end of the cylinder 1A, and fastening the end blocks 1B and 1C to each other by tension bolts 17. A backwash fluid spouting pipe 43 connected to a piston rod 32 of the actuator 3 through a connecting member 37 is air-tightly inserted into a center of the end block 1B through a seal that is an O ring 13 such that the backwash fluid spouting pipe 43 can slide in an axial direction of the housing 1.

The drain outlet 15 formed on the lower end block 1C is closed in filtering while opened in backwashing of the filter 2 for draining the backwash fluid.

Because other structures and operations of the fourth embodiment are substantially similar to those of the third embodiment, descriptions of them are omitted by providing similar reference numerals and characters to similar or corresponding portions.

As described in detail, according to the present invention, it is possible to provide the filter apparatus with the backwashing mechanism for uniformly, satisfactorily, and automatically removing the foreign matter that has accumulated on the filter and to provide the filter apparatus with the backwashing mechanism for automatically backwashing the filter without manpower and without necessity of maintenance by disposing the plurality of filters and replacing the filters with each other.

Furthermore, because the filter is formed by piling the plurality of resilient filter chips such that the filter can expand and contract, the filtering gaps can be stabilized in the backwashing and a degree of expansion of the filtering gaps can be set arbitrarily according to object to be filtered.

What is claimed is:

1. A filter apparatus with a backwashing mechanism comprising:
   a housing having an inflow portion for fluid to be filtered and an outflow portion for filtered fluid;
   a filter formed into a cylindrical shape from a plurality of piled resilient filter chips, having a filtering gap for passage of said fluid to be filtered between said respective filter chips, and positioned between said inflow portion and said outflow portion in said housing;
   a backwashing channel arranged for causing wash fluid to flow through a flow path not including said outflow portion said filter in a direction reverse to said fluid to be filtered; and
   a gap expanding device for expanding said filtering gap of said filter in backwashing by said wash fluid;
   wherein said filter is formed of spring wire with a plurality of notches for forming said filtering gap.

2. A filter apparatus according to claim 1 further comprising a differential pressure sensor for detecting clogging based on a difference between pressures on primary and secondary sides of said filter and a controller for controlling said gap expanding mechanism based on output of said differential pressure sensor.

3. A filter apparatus assembly with a backwashing mechanism formed by connecting a plurality of said filter apparatuses according to claim 2, connecting said inflow portion of each said filter apparatus to a common supply pipe for fluid to be filtered through an individual supply valve, connecting said outflow portion of each said filter apparatus to a common filtered fluid outflow pipe through an individual outflow valve, and connecting said backwashing channel of each said filter apparatus to a wash fluid supply pipe through an individual backwashing valve.

4. A filter apparatus assembly with a backwashing mechanism formed by connecting a plurality of said filter apparatuses according to claim 1, connecting said inflow portion of each said filter apparatus to a common supply pipe for fluid to be filtered through an individual supply valve, connecting said outflow portion of each said filter apparatus to a common filtered fluid outflow pipe through an individual outflow valve, and connecting said backwashing channel of each said filter apparatus to a wash fluid supply pipe through an individual backwashing valve.

5. A filter apparatus with a backwashing mechanism comprising:
   a housing having an inflow portion for fluid to be filtered and an outflow portion for filtered fluid;
   a filter formed into a cylindrical shape from a plurality of piled resilient filter chips, having a filtering gap for passage of said fluid to be filtered between said respective filter chips, and positioned between said inflow portion and said outflow portion in said housing;
   a backwashing channel arranged for causing wash fluid to flow through a flow path not including said outflow portion said filter in a direction reverse to said fluid to be filtered; and
   a gap expanding device for expanding said filtering gap of said filter in backwashing by said wash fluid;
   wherein said filter is formed of spring wire rod wound into a coil shape, a plurality of notches for forming said filtering gap are formed on said spring wire rod, and said gap expanding device comprises an actuator for driving said spring wire rod in such a direction as to move opposite ends of said spring wire rod away from each other.

6. A filter apparatus according to claim 5 further comprising one or more intermediate retaining plates attached to an intermediate portion of said filter and a gap adjusting mechanism for stopping said intermediate retaining plates in such a position as to uniformalize said filtering gaps in expansion of said filter by operation of said actuator.

7. A filter apparatus with a backwashing mechanism comprising:
- a housing having an inflow portion for fluid to be filtered and an outflow portion for filtered fluid;
- a filter formed into a cylindrical shape from a plurality of piled resilient filter chips, having a filtering gap for passage of said fluid to be filtered between said respective filter chips, and positioned between said inflow portion and said outflow portion in said housing;
- a backwashing channel arranged for causing wash fluid to flow through said filter in a direction reverse to said fluid to be filtered; and
- a gap expanding device for expanding said filtering gap of said filter in backwashing by said wash fluid;
- wherein said filter is formed by piling a plurality of annular leaf spring members, each said leaf spring member is formed with a spring portion for expanding a gap between said leaf spring member and adjacent leaf spring member by resilient force and a projecting portion for forming said filtering gap in fixed size between respective leaf spring members by functioning as a stopper when said filter is compressed, said gap expanding device comprises an actuator, and said actuator compresses said piled leaf spring members against a biasing force of said spring portions in filtering and cancels said compression in backwashing.

8. A filter apparatus according to claim 7, wherein an inside of said cylindrical filter communicates with said outflow portion of said housing and a backwash fluid spouting pipe inserted into said filter is used as a support guide for said leaf spring members.

9. A filter apparatus with a backwashing mechanism comprising:
- a housing having an inflow portion for fluid to be filtered and an outflow portion for filtered fluid;
- a filter formed into a cylindrical shape from a plurality of piled resilient filter chips, having a filtering gap for passage of said fluid to be filtered between said respective filter chips, and positioned between said inflow portion and said outflow portion in said housing;
- a backwashing channel for causing wash fluid to flow through said filter in a direction reverse to said fluid to be filtered; and
- a gap expanding device for expanding said filtering gap of said filter in backwashing by said wash fluid;
- wherein said filter is formed by alternately piling a plurality of annular leaf spring members and filtering plates, each said leaf spring member is in a wave shape in a thickness direction, flattened to have a plate-like shape when compressed and restores said wave shape in non-compression to form a gap between said leaf spring member and adjacent filtering plate, each said filtering plate has on front and back opposite faces thereof a large number of filtering grooves in radial directions, said gap expanding device comprises an actuator, and said actuator pushes said leaf spring members against said filtering plates against biasing force of said spring members in filtering and cancels said pushing in backwashing.

* * * * *